United States Patent
Srivastava

(10) Patent No.: US 7,761,502 B2
(45) Date of Patent: Jul. 20, 2010

(54) CALLBACK INTERFACE FOR MULTIPOOLS

(75) Inventor: Rahul Srivastava, Randolph, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 605 days.

(21) Appl. No.: 11/294,214

(22) Filed: Dec. 5, 2005

(65) Prior Publication Data

US 2006/0146878 A1 Jul. 6, 2006

Related U.S. Application Data

(60) Provisional application No. 60/640,449, filed on Dec. 31, 2004.

(51) Int. Cl.
*G06G 15/16* (2006.01)
*G06G 11/00* (2006.01)

(52) U.S. Cl. .......................... 709/203; 709/250; 714/4

(58) Field of Classification Search ................. 709/203, 709/250; 714/4
See application file for complete search history.

(56) References Cited

U.S. PATENT DOCUMENTS

| 5,987,621 | A * | 11/1999 | Duso et al. ................... 714/4 |
| 6,173,311 | B1 | 1/2001 | Hassett |
| 6,199,110 | B1 | 3/2001 | Rizvi |
| 6,490,610 | B1 * | 12/2002 | Rizvi et al. ............... 718/101 |
| 6,674,713 | B1 * | 1/2004 | Berg et al. ................ 370/217 |
| 6,728,747 | B1 * | 4/2004 | Jenkins et al. ............ 718/101 |
| 2003/0036919 | A1 * | 2/2003 | Felt et al. ..................... 705/1 |
| 2003/0163755 | A1 * | 8/2003 | Fung et al. ..................... 714/4 |
| 2004/0006711 | A1 * | 1/2004 | Krishnaswamy et al. .... 713/201 |
| 2004/0221031 | A1 | 11/2004 | Desai |
| 2004/0250248 | A1 * | 12/2004 | Halpern et al. ............. 718/100 |
| 2005/0038801 | A1 * | 2/2005 | Colrain et al. ............. 707/100 |
| 2005/0138476 | A1 * | 6/2005 | Taylor et al. ................. 714/37 |
| 2007/0226359 | A1 | 9/2007 | Gunduc et al. |

OTHER PUBLICATIONS

JDBC Developer's Guide and Reference, Part No. A96654-01, Mar. 2002, [online], [retrieved on Sep. 22, 2008]. Retrieved from the Internet <http://download-uk.oracle.com/docs/cd/B10501_01/java.920/a96654.pdf>, pp. 445-446 (17-16-17-18).*
WebLogic, WebLogic Server and WebLogic Express, Jul. 23, 2004, [online], retrieved from the internet <web.archive.org/web/20040723133555/e-docs.bea.com/wls/docs81/pdf/jdbc.pdf>, pp. 1-59 as printed.*
JDBC, Configuring and Using WebLogic JDBC, Oct. 2, 2003, [online], retrieved from the internet, <web.archive.org/web/20031002154431/http://e-docs.bea.com/wls/docs81/jdbc/programming.html>, pp. 1-23 as printed.*
International Search Report for PCT/US05/46581, dated Jun. 29, 2006, 7 pages.
European Search Report in re Application No. 05855184.7 dated Jul. 6, 2009, 14 pages.
BEA Systems, "Configuring WebLogic JDBC Features" dated Oct. 6, 2009, 11 pages.
Zhang, et al. "Building Extensible and High Performance Distributed Transaction Service", Proceedings of the 2004 Australian Software Engineering Conference, IEEE Computer Society, 9 pages.

* cited by examiner

*Primary Examiner*—Jeffrey Pwu
*Assistant Examiner*—Michael Chao
(74) *Attorney, Agent, or Firm*—Fliesler Meyer LLP

(57) ABSTRACT

A multipool can do a callback to an application before switching connection pools.

13 Claims, 9 Drawing Sheets

CALLBACK INTERFACE FOR MULTIPOOLS

CLAIM OF PRIORITY

This application claims priority to U.S. Provisional Application No. 60/640,449 entitled "Multipool Improvement" by Rahul Srivastava, filed Dec. 31, 2004.

BACKGROUND OF INVENTION

Application servers, such as the WebLogic™ Server available from BEA Systems of San Jose, Calif., allow users to do a number of functions. One of the functions typically supported by application servers is to provide access to a database. In one embodiment, a connection pool such as a Java Database Connectivity (JDBC) connection pool is provided by the application server. The connection pool provides a number of already set up connections with a database. These connections are provided to applications of the application server as needed. Such connection pools allow for a relatively large number of applications in the application server to access a database while reducing the database connection time for the application.

DETAILED DESCRIPTION

Multipools Using Automatically Maintained Active Connection Pool List

Figure 1:
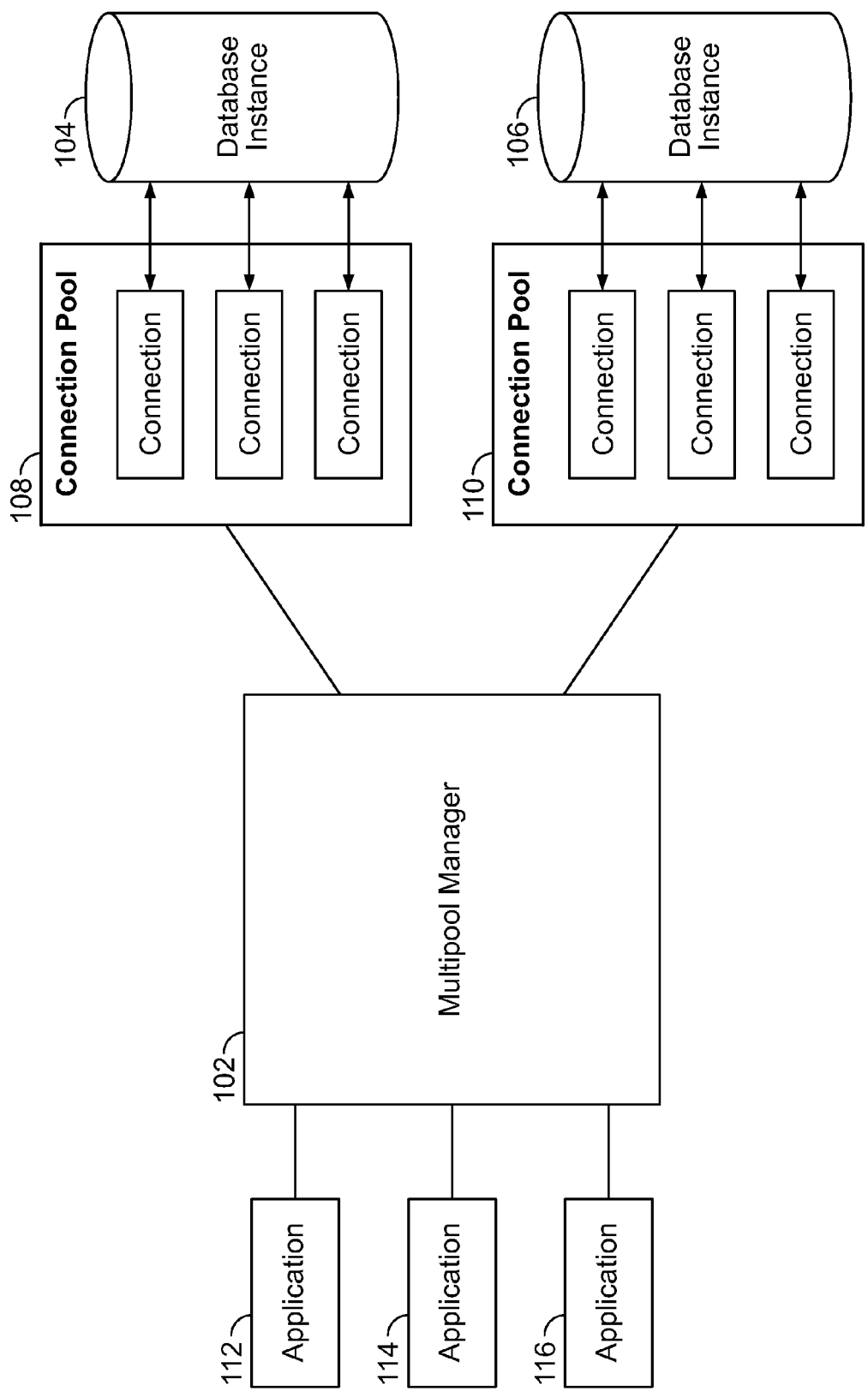
FIG. 1 is a diagram illustrating the use of a multipool with a multipool manager of one embodiment.

FIG. 1 is a diagram that illustrates the operation of a multipool manager 102. In some systems, it is desired to have multiple database instances, such as database instances 104 and 106. The database instances 104 and 106 can each contain a current version of a database run on independent machines, for example. When there are multiple database instances, it can be desirable to use multiple connection pools, such as connection pool 108 and connection pool 110. Rather than dedicating each application, such as applications 112, 114 and 116, to a single connection pool and thus to a single database instance, a multipool system can be used. In a multipool system, a multipool manager 102 can determine which connection pool to use to obtain a connection for an application into the database system.

Different methods for selecting a connection pool are possible. One selection method has a primary connection pool and a backup connection pool. The connections are first attempted at a primary connection pool and then upon failure event, the connections are then sent through a backup connection pool. Another method is a load balancing method where the connections are distributed between multiple connection pools to balance the load at the different connection pools. A round-robin method is an example of a load balancing method.

One embodiment of the present invention comprises a multipool system to connect to database instances comprising multiple connection pools 202 and 204. The connection pools 202 and 204 are adapted to provide connections to database instances 206 and 208. A multipool manager 210 is adapted to select and set up connections to a database instance through a connection pool. The multipool manager 210 is adapted to keep track of dead connection pools between requests for connections.

The multipool manager 210 can select a connection pool in a manner that avoids any dead connection pools. For the example of FIG. 2A, the multipool manager can avoid selecting connection pool A if it is dead. In one embodiment, a selection of only non-dead connection pools is done as authorized by an application. In one embodiment, the application indicates by a callback or by configuration info whether to switch connection pools.

The multipool manager 210 can be adapted to maintain a list 212 of active connection pools and to use the list 212 to determine what connection pool to connect through. The term "list" is not meant to imply any specific data structure. The active connection pools on the list can include those connection pools that are not those connection pools determined by the multipool manager to be dead.

Dead connection pools can be tested in the background to see whether they should be returned to the active connection pool list. The list of active connection pools can be a subset of a candidate list provided by an application. Alternatively, separate candidate lists and active lists can be maintained, and the multipool manager can select a connection pool that is on both lists. The multipool manager 210 can store an indication for each connection pool associated with the candidate list indicating whether the connection pool is active or dead.

Figure 2A:
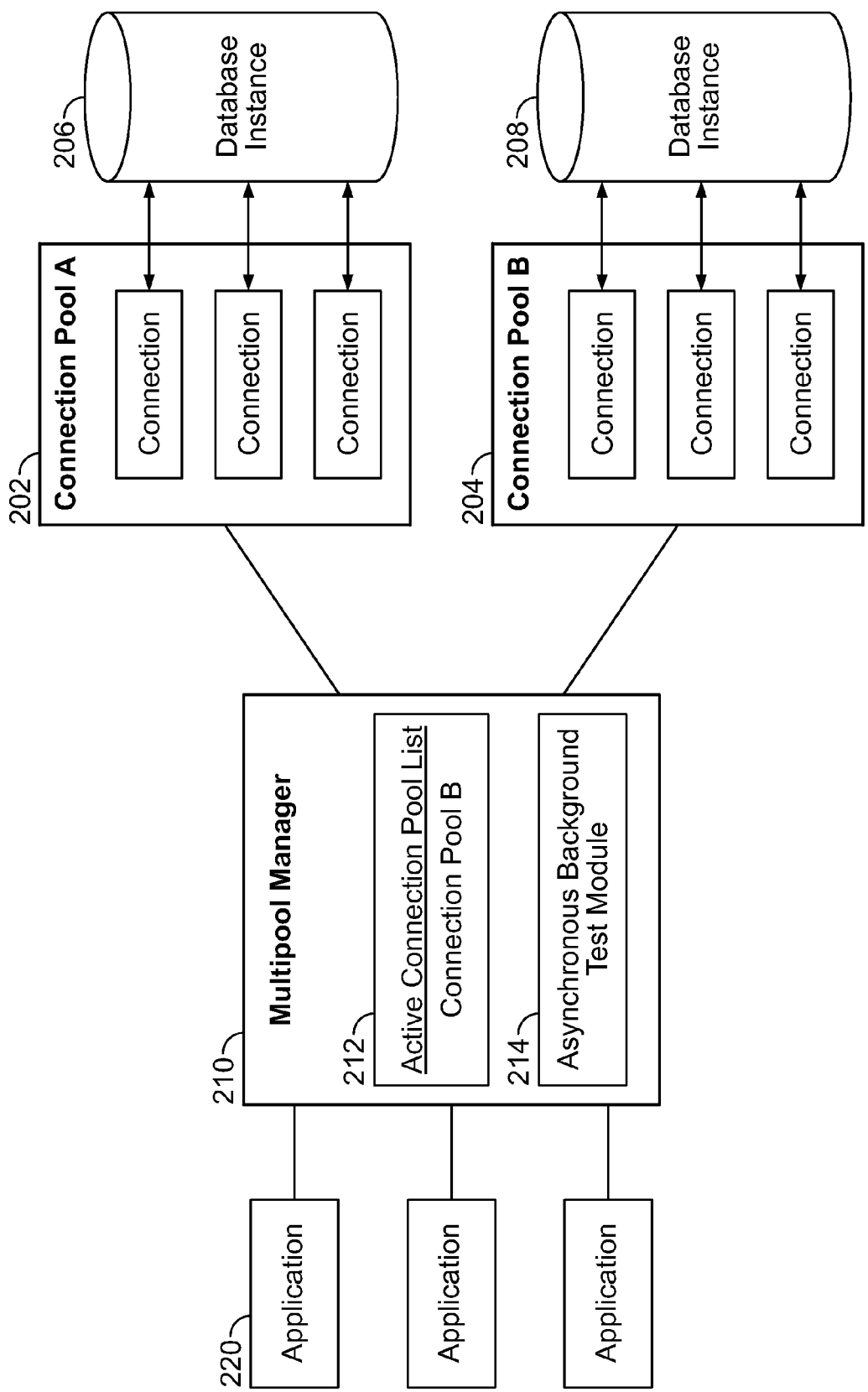
FIGS. 2A-2B are diagrams illustrating the use of a multipool manager having an active connection pool list.

In example of FIG. 2A, the connection pool A is dead, thus not on the active connection pool list 212. An application, such as an application 220, can request a connection into one of the database instances 206 or 208 through the multipool manager 210. In FIG. 2A, the multipool manager 210 selects a connection through the connection pool B.

The multipool manager 210 can test whether a connection pool has been revived in the background asynchronously. In one embodiment, an asychronous background test module 214 can be used.

Figure 2B:
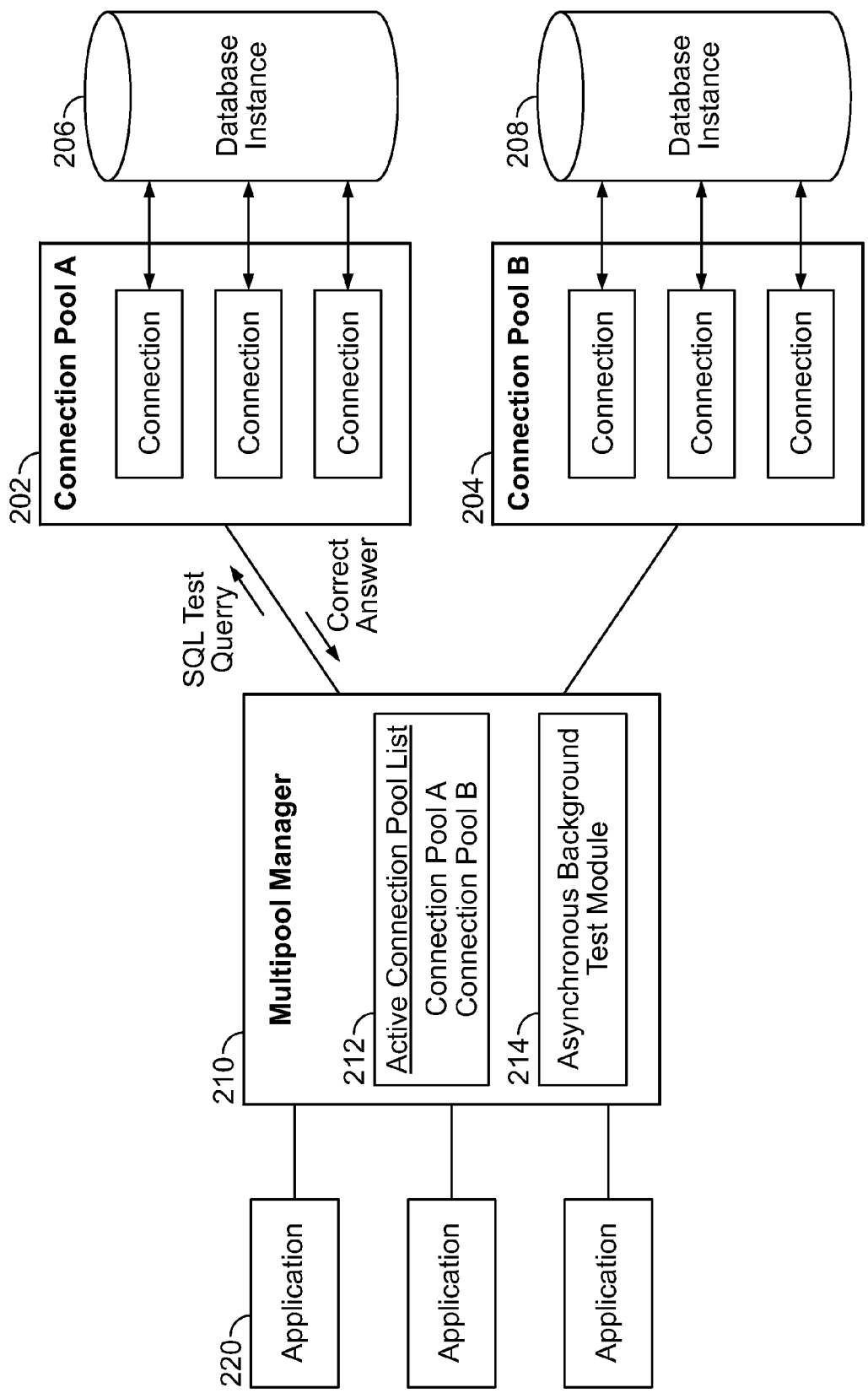

FIG. 2B illustrates an example of this background testing. In this example, a SQL test query is sent to the dead connection pool A. If the correct answer is obtained from the database instance 206, the multipool manager 210 can update the active connection pool list 212 with an indication of the connection pool A. In this way, the next time an application requests a connection to a database, a connection through the connection pool A is possible.

Figure 3A:
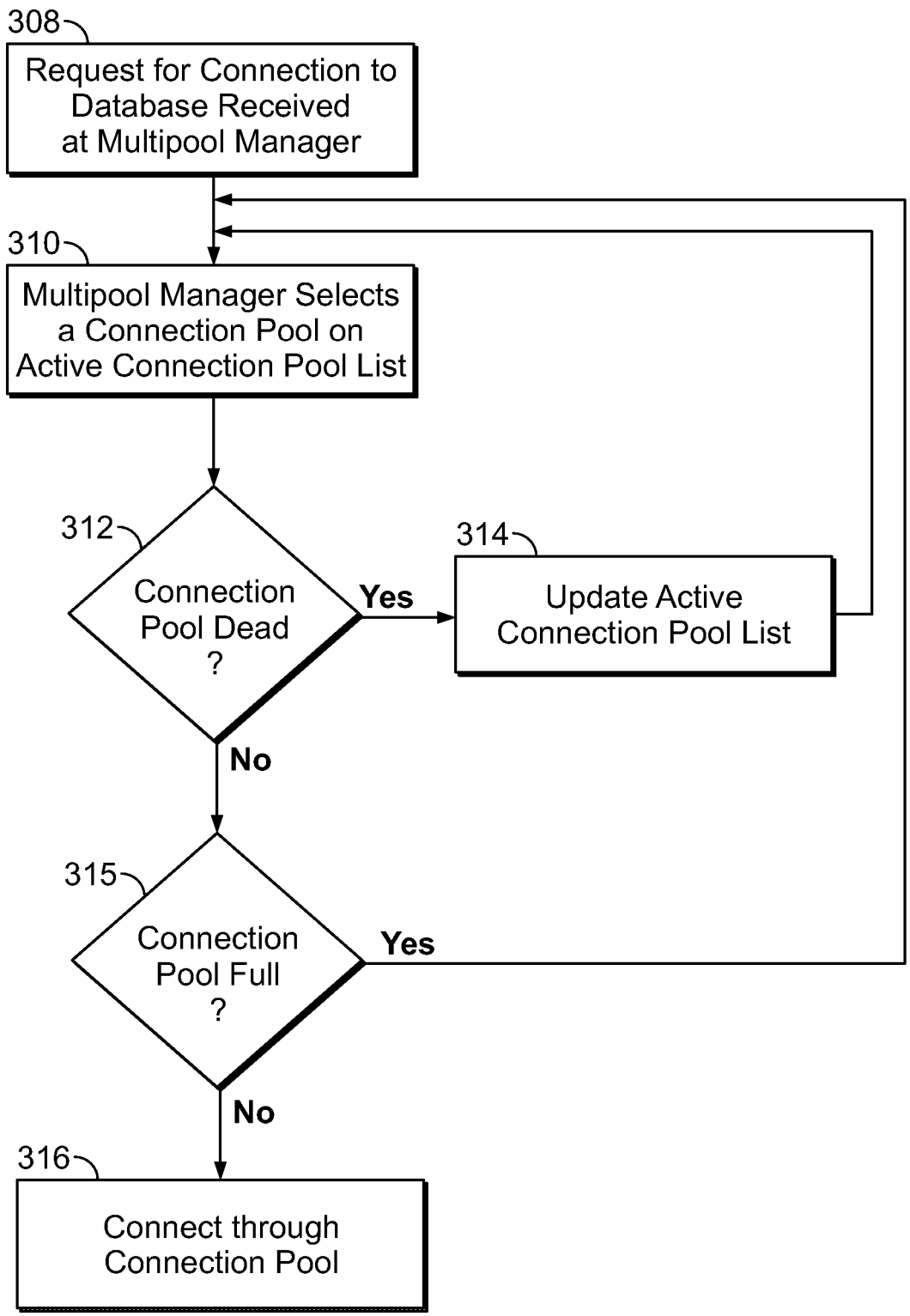
FIGS. 3A-3B are flowcharts that illustrate the use of an active connection pool list of one embodiment.
Figure 3B:
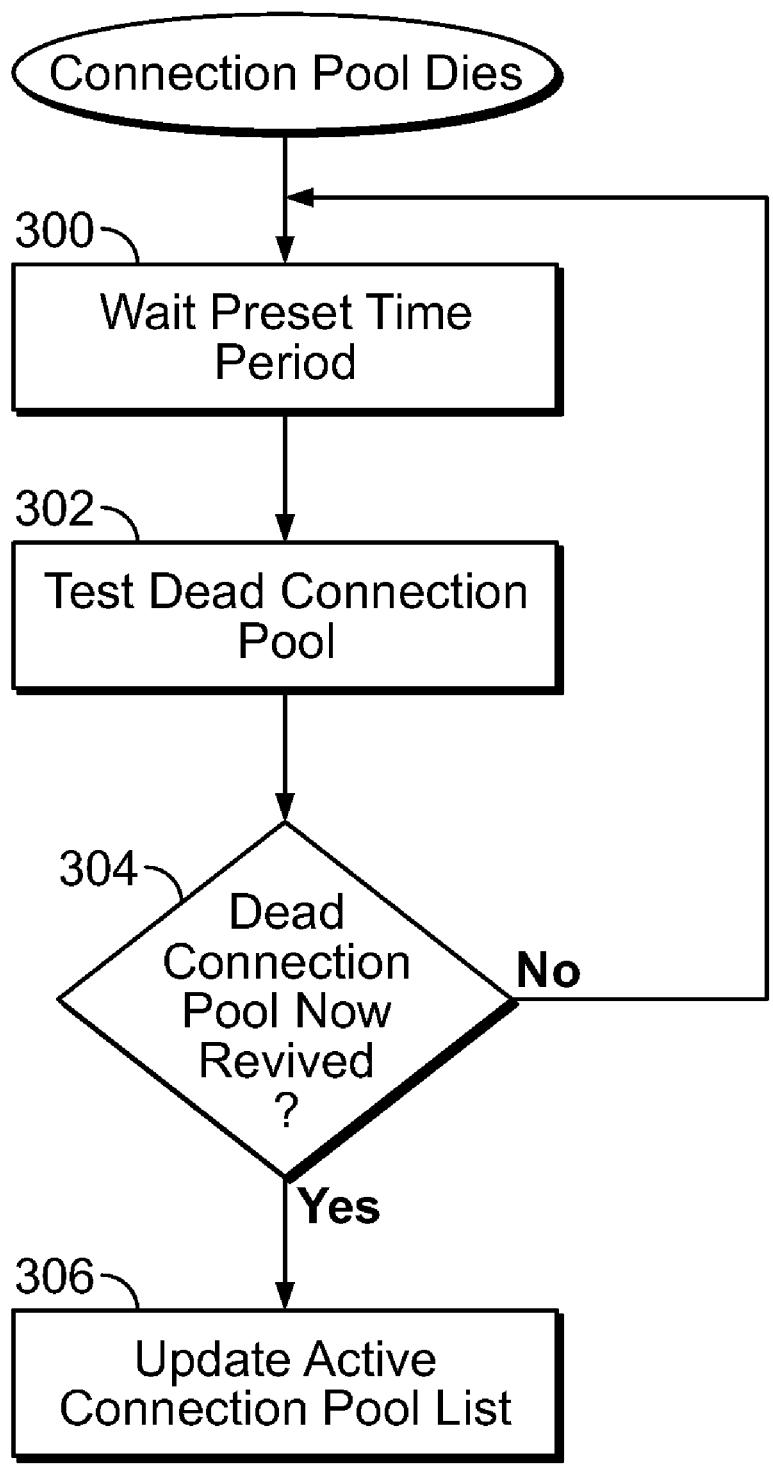

FIG. 3B illustrates a flowchart illustrating the asynchronous testing of a dead connection pools. In one embodiment, preset wait time passes in step 300. The wait time can be set by an application and stored with the configuration information for the multipool manager or a default value can be used In step 302, the dead connection pool is tested. If the dead connection pool has revived as indicated by the test, the active connection pool list 306 is updated, otherwise, the cycle repeats waiting the preset time in step 300.

FIG. 3A illustrates the operation of the request for a connection to a database in one embodiment. In step 308, a request for connection to the database is received at a multipool manager. In step 310, the multipool manager can select a connection pool. In one embodiment, the multipool manager 210 selects a connection pool on an active connection pool list. The connection can then be attempted. In step 312, it is checked whether the connection pool is dead. If the connection pool is dead, in step 314, the active connection pool list is updated and new connection pool is selected from the active pool list. If the connection pool is not dead, in step 315, it is checked to see whether the connection pool is full. If there is no available connections, then the multipool manager can select another connection pool from the active connection pool list, in step 310. If any selected connection pool is not dead or full, then, in step 316, the connection is done through the selected connection pool.

Figure 4:
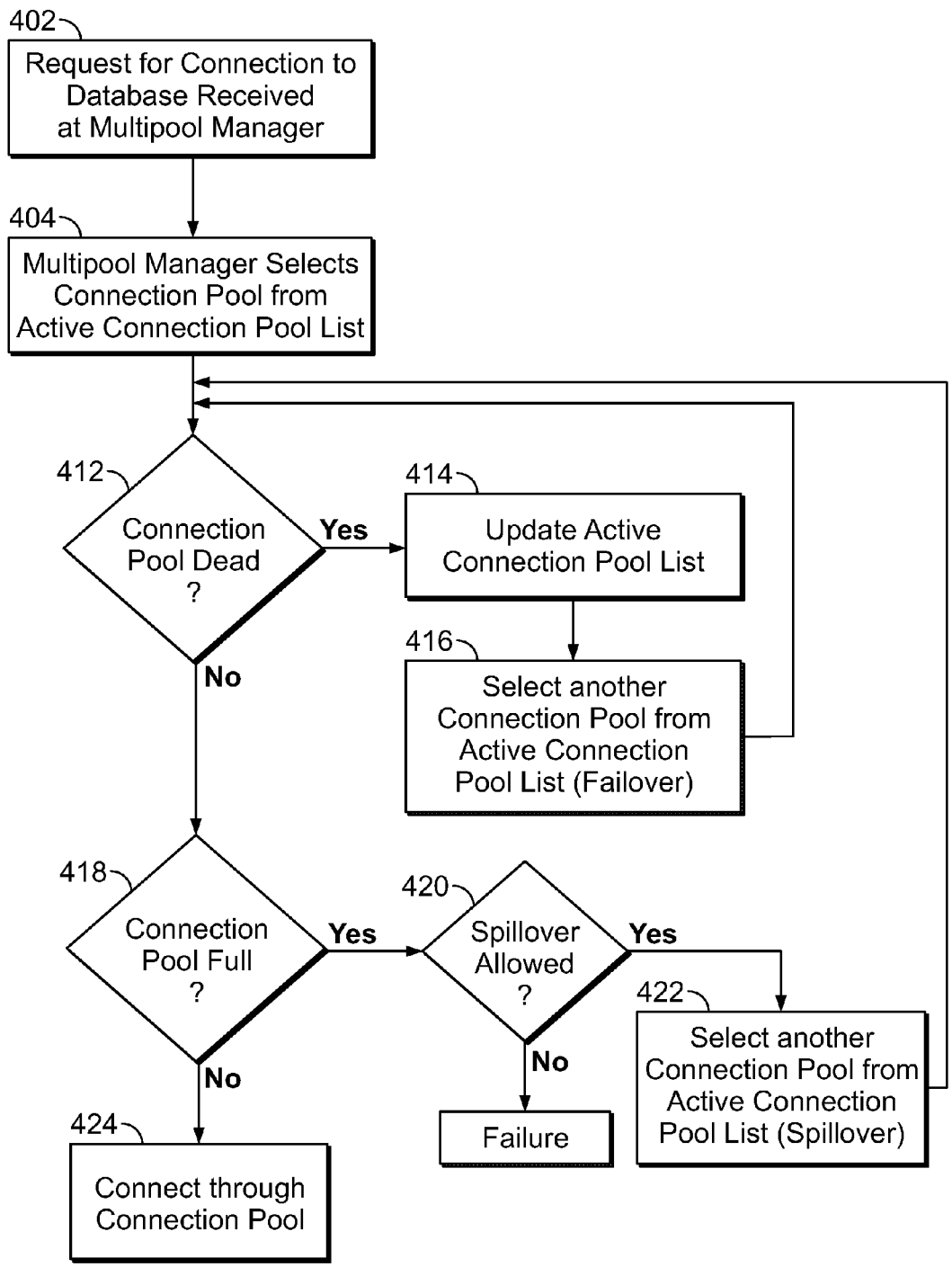
FIG. 4 is a diagram illustrating the operation of a multipool manager of one embodiment of the present invention.

FIG. 4 is a flowchart illustrating different conditions that can occur in one embodiment of the present invention. In step 402, a request for a connection to the database is received at a multipool manager. In step 404 a multipool manager selects a connection pool from the active pool list. Its possible, as determined in step 408, that the selected connection pool is a newly revived connection pool. If so, this is called a failback as indicated in step 410. In step 412, it is checked whether the connection pool is dead. If a connection pool is dead, the active connection pool list is updated in step 414, and in step 416, another connection pool is selected from the active connection pool list, this is called a failover condition. In step 418, if the connection pool is not dead it is checked to see whether the connection pool is full. If the connection pool is full, in step 420, it is checked to see whether a spillover is allowed. If it is, in step 422 another connection pool is selected from the active connection pool list. Step 424, shows a connection is made. As described below an application may authorize a failback, failover or spillover condition with a callback or with config information.

One embodiment of the present invention is a multipool manager adapted to select and set up connections to a database instance through a connection pool. The multipool manager is adapted to keep track of dead connection pools. The multipool manager implements a selection method in which the multipool manager avoids selecting dead connection pools to provide a connection for an application.

One embodiment of the present invention is a multipool system to connect to database instances comprising multiple connection pools. The connection pools are adapted to provide connections to database instances. A multipool manager is adapted to select and set up connections to a database instance through a connection pool. The multipool manager is adapted to keep track of dead connection pools and to asynchronously test whether a connection pool is revived.

Callback Interface for Multipools

In some instances it is desirable to check with the application before switching the connection pool. Switching a connection pool can be a complicated process. Sometimes there are preferred database instances and it is not desired that the user switch to another less desirable database instance unless the first database instances are truly unavailable. In one embodiment of the present invention, the multipool manager implements callbacks to an application in order to get authorization from the application for a switch of connection pools.

In one embodiment of the present invention, a multipool system is used to connect to database instances with multiple connection pools. The connection pools 502 and 504 are adapted to provide connections to database instances 508 and 510. A multipool manager 506 is adapted to select and set up connections to a database instance through a connection pool. The multipool manager 506 is adapted to check with an application 512 before switching connection pools.

Figure 5A:
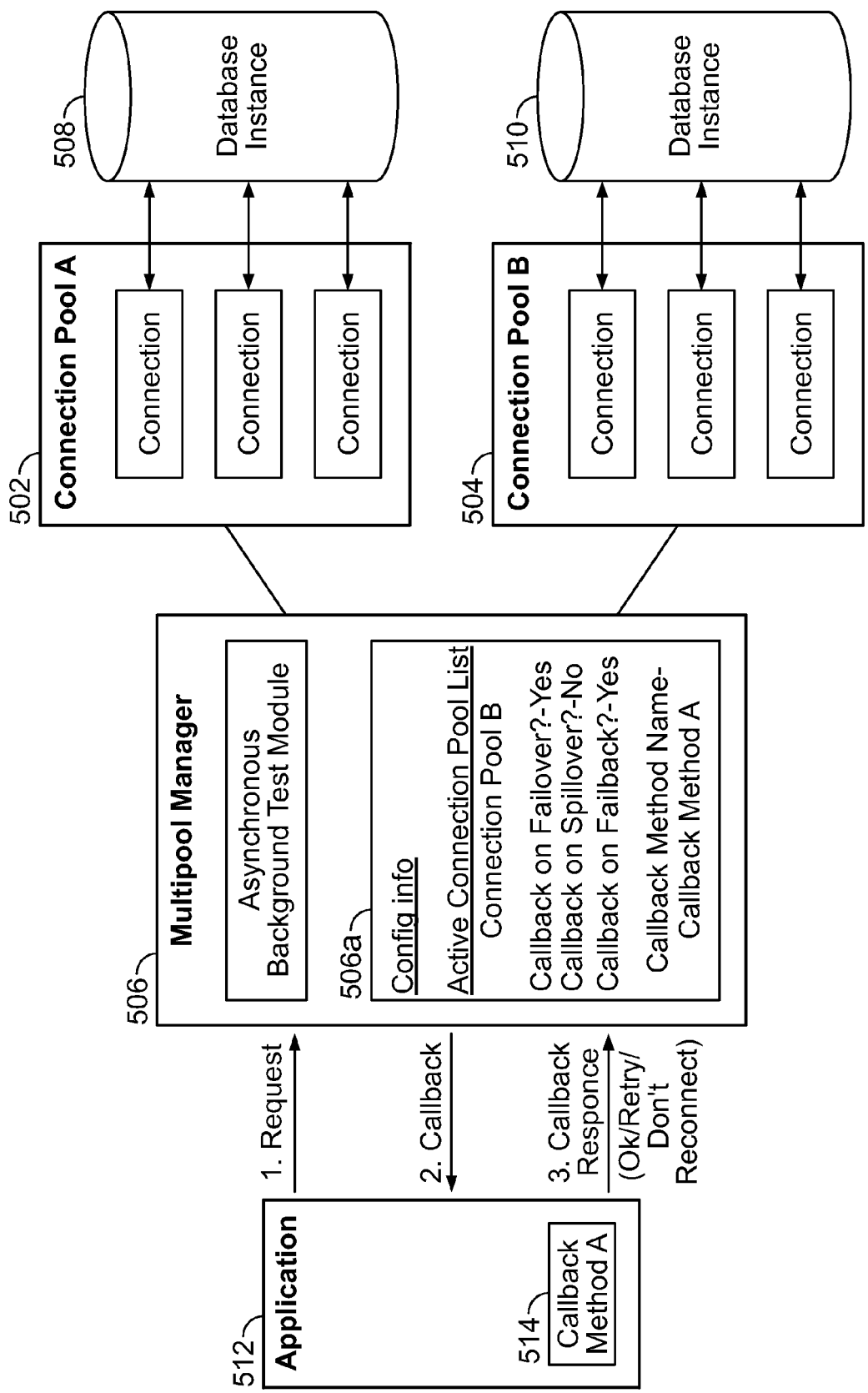
FIGS. 5A-5B are diagrams that illustrate the use of callbacks with a multipool manager of embodiments of the present invention.

In the example of FIG. 5A, a callback is available from the multipool manager 506 to the application 512. If the connection pool is to be switched, the multipool manager 506 can do a callback to the application 512 to determine whether the application will authorize the switch. In example of FIG. 5A, the active connection pool list includes connection pool B but not connection pool A. Before switching to connection pool B the multipool pool manager 506 can do a callback to the application 512. In one embodiment, in step 1 a request for connection is received by the multipool manager 506. In step 2, after the multipool manager determines that a connection pool switch may be desirable, a callback is done to the application 512. The callback can be, for example, the calling of the callback method 514 which is part of the application 512. The multipool manager 506 can store configuration information 506a which may include an indication of what conditions the callback is to be sent and/or an indication of the callback method name, in this case, callback method A. The application code can implement a callback method 514 in any manner. In one embodiment, a callback response is received by the multipool manager in step 3. The callback response can be an indication which multipool manager 506 can use to determine how to connect.

In one embodiment, the callback response indications include an "OK" indication. When the "OK" indication is received, the multipool manager switches to the new connection pool. Another callback response indication is a "retry" indication. If a "retry" indication is received, the multipool manager 506 can attempt to get a connection with the old connection pool. Another possible callback response indication is a "don't reconnect" indication. When a "don't reconnect" indication is received the multipool manager not attempt to make a connection.

Figure 5B:
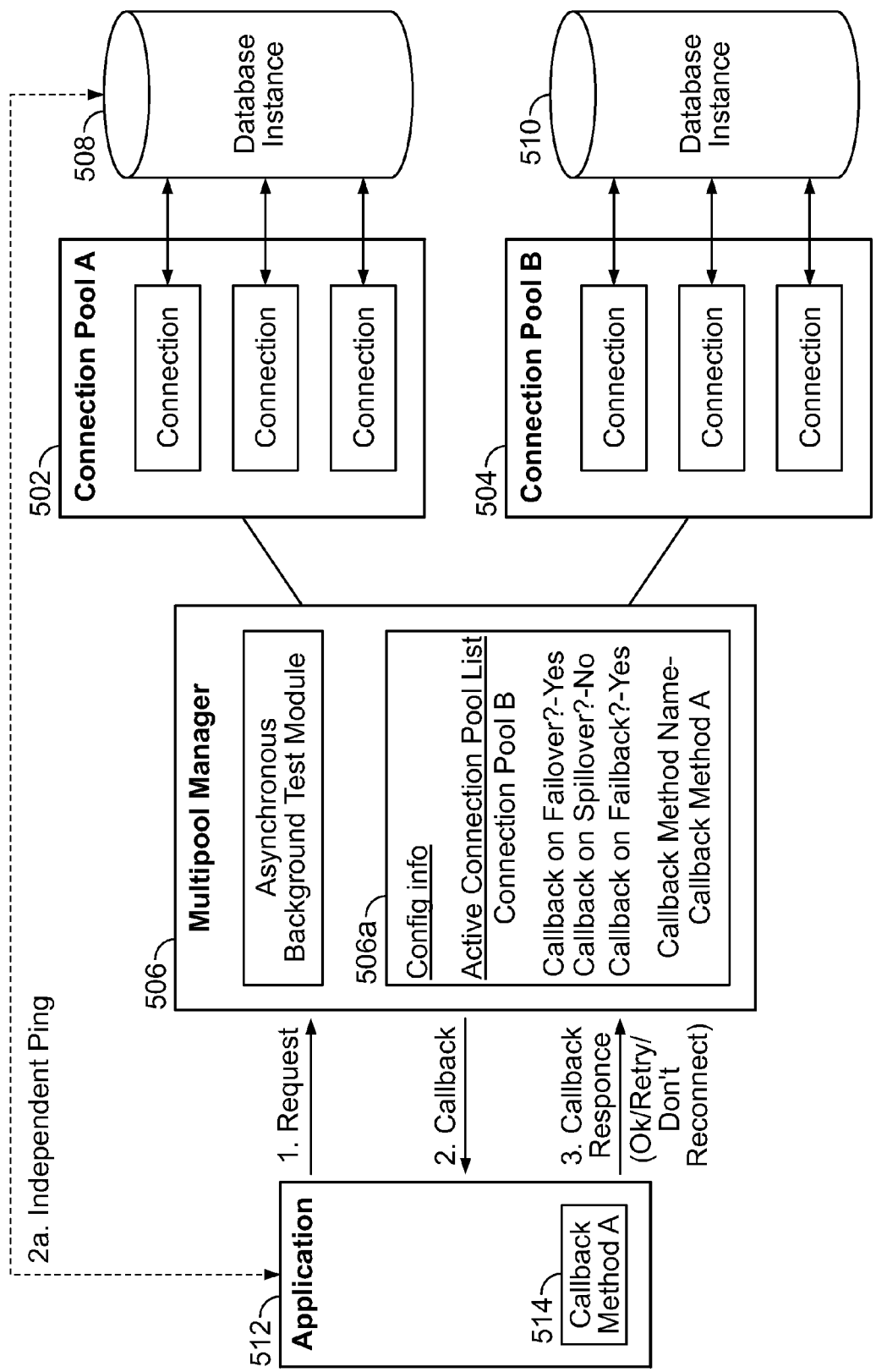

FIG. 5B illustrates a possible reason that a "retry" indication might be provided by the callback method. In one example, it may be desirable to do a certain number of attempts onto a primary database instance before switching over to a secondary database instance. FIG. 5B illustrates an example in which an independent ping is done from the application 512 to the database instance 508 as part of the callback method. If the independent ping comes up with an indication that the database instance 508 is still running, the application can send a "retry" indication. If the application 512 is sufficiently convinced that the database instance is down, a "OK" callback response can be sent.

Any callback method can be implemented by the application 512. In one example, the multipool manager has a callback interface that can be implemented by any application code.

Figure 6:
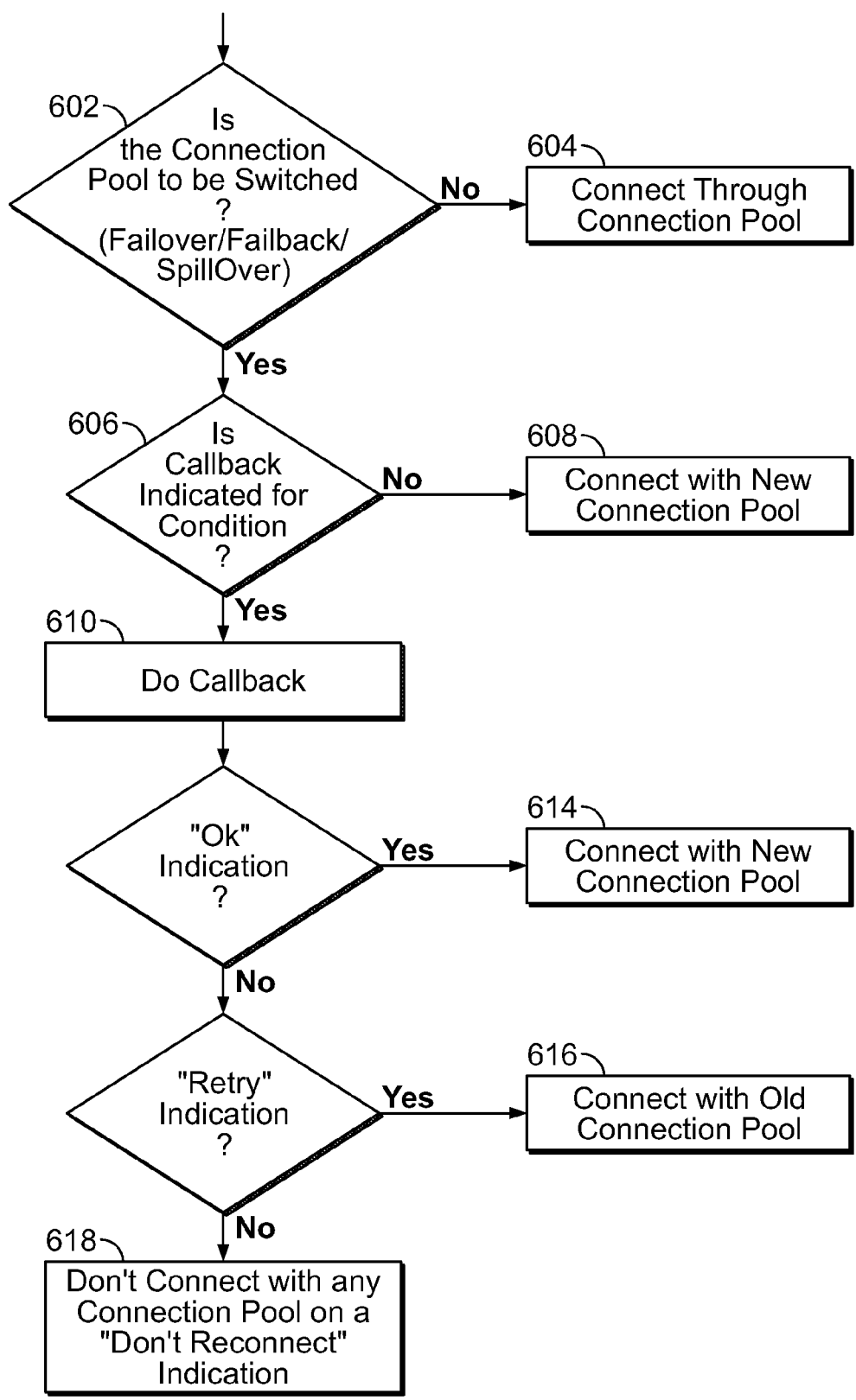
FIG. 6 is a flowchart illustrating the use of callbacks with a multipool manager of one embodiment of the present invention.

FIG. 6 is a diagram illustrating the operation of callbacks of one embodiment. In step 602, it is checked if the connection pool is to be switched as determined by the multipool manager. If the connect pool is not to be switched, the connection is done to the connection pool in step 604. If the connection is to be switched, then in step 606, it is checked whether a callback is indicated for the condition. If no callback is indicated, then the connection is done through the new connection pool without a callback. If a callback is indicated, in step 610, a callback is done. If an "OK" indication is received, the connection is done with the new connection pool in step 614. If a retry indication is received, a connection is attempted to be done using the old connection pool, in step 616. Otherwise, if a "don't reconnect" indication is received, no connection through a connection pool is done in Step 618.

In one embodiment, a multipool manager is adapted to select and set up connections to a database instance through a connection pool. The multipool manager is adapted to check with an application before switching connection pools.

Detailed Description of One Non-Limiting Example

The following description gives one non-limiting implementation of multipool implementation. The discussion below gives one embodiment, but those skilled in the art will understand that other implementations of the above-described concepts can be done. Any potentially limiting language given below is to be interpreted in the context of the specific non-limiting implementation and is not meant to limit the general concepts.

MultiPools can check with the application before failing over to alternate Pools. This is useful if the configured test for the Pool currently in use encounters a random or transient failure, if the application wants to control when a Database Management System (DBMS) instance that's currently not handling clients is brought back into service or if applications can specified an identity when getting connections from Pools, and connections from a matching pool should be returned. This is useful in cases where the DBMS vendor does not provide native support for setting client identities on anonymous JDBC connections.

A number of improvements can be implemented for multipools.

FAILOVER—Existing MultiPool algorithm "HIGH_AVAILABILITY" will be renamed as "FAILOVER". It will also optionally provide the ability to route application requests for connections to alternative Pools if the current Pool is busy.

HEALTH—Existing functionality will be improved to mark dead Pools so that application requests for connections are not routed to these Pools.

CALLBACK—A callback interface will be provided to applications to control MultiPool decision to failover to alternative Pools when a failed Pool is detected, or to fail back to Pools previously marked dead.

Applications can configure a FAILOVER algorithm. FAILOVER can have connections sent through a primary connection pool and have these connections routed through a secondary connection pool upon the failure of the primary connection pool. FAILOVER can optionally also be able to route application requests for connections to alternative Pools if the current Pool is busy.

In one embodiment, applications will also be able to configure the following MultiPool attribute:

```
/**
 * If set, application requests for connections will be routed to
 * alternate pools if current pool is busy. This is only relevant
 * when running with the HIGH_ALGORITHM algorithm. Default implies
 * feature is disabled.
 *
 * @param newVal The new attribute value
 * @dynamic
 * @default false
 */
public boolean isFailoverRequestIfBusy( );
public void setFailoverRequestIfBusy(boolean failoverRequestIfBusy);
```

Applications can be able to implement and register a callback with the system. This callback can be invoked when the MultiPool detects a dead or busy Pool, giving application the ability to control whether MultiPool fails over to an alternative Pool or not.

In one embodiment, applications will be able to implement the following interface:

```
/**
 * Application can optionally implement this interface if it wants
 * to control the failover behavior of WebLogic Server MultiPools.
 *
 * If application has registered a class with WebLogic Server that
 * implements this interface, WebLogic Server will invoke this interface's
 * method "allowPoolFailver( )" and take different actions depending upon
 * the return code from the method's invokation.
 *
 *                                                                  @sec
weblogic.management.configuration.JDBCMultiPoolMBean#setConnectionPoolFailoverCallbackHandler
 */
public interface ConnectionPoolFailoverCallback {
    // name of this interface
        static    public    final    String    IF_NAME    =
"weblogic.jdbc.extensions.ConnectionPoolFailoverCallback";
    // opcodes for method 'allowPoolFailover( )'
    static public final int OPCODE_CURR_POOL_DEAD = 0;
    static public final int OPCODE_CURR_POOL_BUSY = 1;
    static public final int OPCODE_REENABLE_CURR_POOL = 2;
    // return codes for method 'allowPoolFailover( )'
    static public final int OK = 0; // application is ok with impending action
    static public final int RETRY_CURRENT = 1; // retry current pool
    static public final int DONOT_FAILOVER = 2; // do not failover, WLS will
throw weblogic.jdbc.extensions.PoolUnavailableSQLException
    /*
     * MultiPool will invoke this method under various failover/failback
     * conditions. Application should return one of the above-defined codes
     * from this method, based upon application-specific semantics.
     *
     * @param currPool - name of connection pool currently in use.
     *               will NEVER be null
     *
```

```
 * @param nextPool - name of alternate connection pool.
 *              will be null for opcode 'OPCODE_REENABLE_CURR_POOL'
 *
 * @param opcode - operation being performed
 *       OPCODE_CURR_POOL_DEAD - 'currPool' is Dead, MultiPool needs to
 *           failover application requests for connections to 'nextPool'.
 *
 *           Application should return "OK", "RETRY_CURRENT" or "DONOT_FAILOVER",
 *           depending on what it wants the MultiPool to do.
 *
 *       OPCODE_CURR_POOL_BUSY - 'currPool' is Busy, MultiPool needs to
 *           re-route application requests for connections to 'nextPool'
 *
 *           Application should return "OK" if it is ok with this action,
 *           else should return either of the other return codes.
 *
 *       OPCODE_REENABLE_CURR_POOL - 'currPool' was previously found
 *           Dead and was consequently disabled. It has now been found healthy,
 *           and MultiPool needs to re-enable it.
 *
 *           Application should return "OK" if it is ok with this action,
 *           else should return either of the other return codes.
 */
    public int allowPoolFailover(String currPool, String nextPool, int opcode);
}
```

Application can register this callback in the attribute "ConnectionPoolFailoverCallbackHandler" of JDBCMultiPoolMBean.

```
/**
 * Used to set the absolute name of the application class that implements
 * the interface weblogic.jdbc.extensions.ConnectionPoolFailoverCallback.
 *
 * @see weblogic.jdbc.extensions.ConnectionPoolFailoverCallback
 * @non-dynamic
 /*
public String getConnectionPoolFailoverCallbackHandler( );
public void setConnectionPoolFailoverCallbackHandler (String className);
```

Multipools can be enhanced to internally monitor and track the health of the Pools underneath. If a Pool is determined to be dead, it will be marked so and subsequent application requests for connections will not be routed to that Pool.

In one embodiment, applications will be able to configure the following JDBCMultiPoolMBean attribute:

```
/**
 * Used to configure the frequency at which the MultiPool checks
 * the health of connection pools that were previously found
 * dead and were consequently disabled.
 *
 * @param newVal The new attribute value
 * @dynamic
 * @default 300
 */
    void setHealthCheckFrequencySeconds (int newVal);
    int getHealthCheckFrequencySeconds( );
```

Embodiments may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system which enables applications to connect to database instances using multiple connection pools, and to control switching between the connection pools, comprising:

a computer including a processor;

a plurality of connection pools at the computer, which are adapted to provide connections from applications to database instances;

a multipool manager, which maintains an active connection pool list that indicates currently active connection pools, including periodically verifying dead connection pools to determine whether they should be returned to the active connection pool list, and which selects connections to the database instances using the plurality of connection pools, and performs switching between the connection pools, wherein the multipool manager is adapted to check with the applications, using a callback interface and callbacks, before switching connection pools;

a callback handler interface provided by the multipool manager to the applications which allows the applications to register callbacks for events; and wherein, upon an event requiring a possible switch in connection pools, the multipool manager checks with those applications which have registered a callback using the callback handler interface, and wherein said checking includes determining that a desired connection pool is on the active connection list, performing a callback to those applications using a specified callback method, providing an indication to those applications as to the possible switch in connection pools, receiving a response from those applications, indicating one of retrying an existing connection, accepting, or rejecting the switch, and retrying, accepting, or rejecting the switch for those applications to the desired connection pool, as authorized by the application's response.

2. The system of claim 1, wherein the multipool manager checks with the application before a failover.

3. The system of claim 1, wherein the multipool manager checks with the application before a failback.

4. The system of claim 1, wherein the multipool manager checks with the application before a spillover.

5. The system of claim 1, wherein callback information is registered with the multipool system by the application.

6. The system of claim 1, wherein the multipool manager adapted to maintain a list of active connection pools and to use the list to determine what connection pool to connect through.

7. A method of enabling applications to connect to database instances using multiple connection pools, and to control switching between the connection pools, comprising the steps of:

providing a computer including a processor, and a plurality of connection pools thereon adapted to provide connections from applications to database instances;

providing a multipool manager, which maintains an active connection pool list that indicates currently active connection pools, including periodically verifying dead connection pools to determine whether they should be returned to the active connection pool list, and which selects connections to the database instances using the plurality of connection pools, and performs switching between the connection pools, wherein the multipool manager is adapted to check with the applications, using a callback interface and callbacks, before switching connection pools;

allowing applications to register callbacks for events using a callback handler interface provided by the multipool manager; and upon an event requiring a possible switch in connection pools, checking with those applications which have registered a callback using the callback handler interface, wherein said checking includes determining that a desired connection pool is on the active connection list, performing a callback to those applications using a specified callback method, providing an indication to those applications as to the possible switch in connection pools, receiving a response from those applications, indicating one of retrying an existing connection, accepting, or rejecting the switch, and retrying, accepting, or rejecting the switch for those applications to the desired connection pool, as authorized by the application's response.

8. The method of claim 7, wherein the multipool manager checks with the application before a failover.

9. The method of claim 7, wherein the multipool manager checks with the application before a failback.

10. The method of claim 7, wherein the multipool manager checks with the application before a spillover.

11. The method of claim 7, wherein callback information is registered with the multipool system by the application.

12. The method of claim 7, wherein the multipool manager adapted to maintain a list of active connection pools and to use the list to determine what connection pool to connect through.

13. A non-transitory computer readable medium including instructions stored thereon which when read and executed by a computer including a processor cause the computer to perform the steps comprising:

providing a plurality of connection pools adapted to provide connections from applications to database instances;

providing a multipool manager, which maintains an active connection pool list that indicates currently active connection pools, including periodically verifying dead connection pools to determine whether they should be returned to the active connection pool list, and which selects connections to the database instances using the plurality of connection pools, and performs switching between the connection pools, wherein the multipool manager is adapted to check with the applications, using a callback interface and callbacks, before switching connection pools;

allowing applications to register callbacks for events using a callback handler interface provided by the multipool manager; and upon an event requiring a possible switch in connection pools, checking with those applications which have registered a callback using the callback handler interface, wherein said checking includes determining that a desired connection pool is on the active connection list, performing a callback to those applications using a specified callback method, providing an indication to those applications as to the possible switch in connection pools, receiving a response from those applications, indicating one of retrying an existing connection, accepting, or rejecting the switch, and retrying, accepting, or rejecting the switch for those applications to the desired connection pool, as authorized by the application's response.

* * * * *

UNITED STATES PATENT AND TRADEMARK OFFICE
CERTIFICATE OF CORRECTION

| | | |
|---|---|---|
| PATENT NO. | : 7,761,502 B2 | Page 1 of 1 |
| APPLICATION NO. | : 11/294214 | |
| DATED | : July 20, 2010 | |
| INVENTOR(S) | : Rahul Srivastava | |

It is certified that error appears in the above-identified patent and that said Letters Patent is hereby corrected as shown below:

In the drawings:
On sheet 3 of 9, in Figure 2B, line 5, delete "Querry" and insert -- Query --, therefor.

In column 2, line 45, delete "asychronous" and insert -- asynchronous --, therefor.

In column 2, line 59, delete "used" and insert -- used. --, therefor.

In column 5-6, line 44, delete ""allowPoolFailver( )"" and insert -- "allowPoolFailover( )" --, therefor.

Signed and Sealed this
Tenth Day of May, 2011

David J. Kappos
*Director of the United States Patent and Trademark Office*